F. W. COOPER.
CABLE HOOK.
APPLICATION FILED OCT. 20, 1914.
1,152,397.
Patented Sept. 7, 1915.
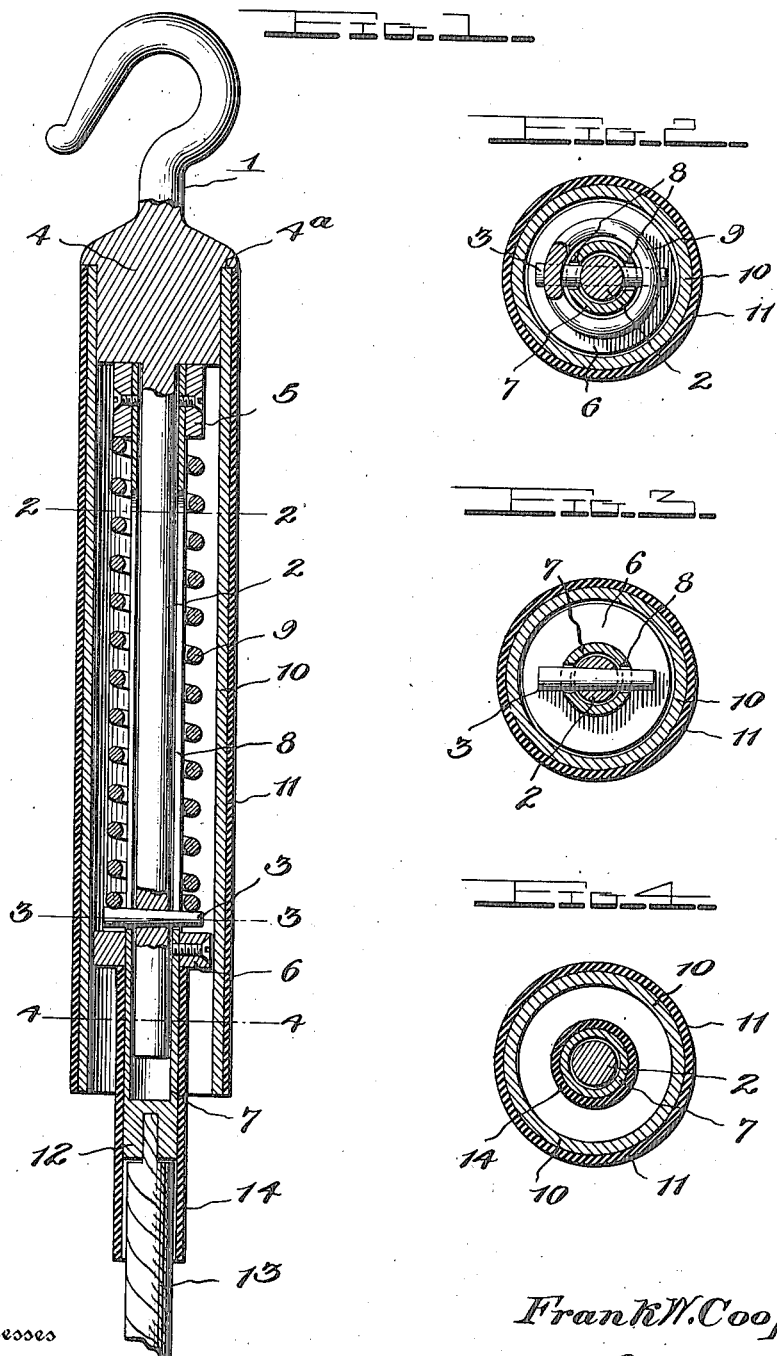
Witnesses
Chas. L. Griesbauer.
E. B. McBath
Inventor
Frank W. Cooper,
By Chas. E. Brock
Attorney

UNITED STATES PATENT OFFICE.

FRANK W. COOPER, OF CORA, WEST VIRGINIA.

CABLE-HOOK.

1,152,397.  Specification of Letters Patent.  Patented Sept. 7, 1915.

Application filed October 20, 1914. Serial No. 867,687.

*To all whom it may concern:*

Be it known that I, FRANK W. COOPER, a citizen of the United States, residing at Cora, in the county of Logan and State of West Virginia, have invented a new and useful Improvement in Cable-Hooks, of which the following is a specification.

This invention relates to a cable hook especially adapted for use in connection with motor operated mine cars with which it is customary to employ a reel and to work the cable over a trolley wire in order to run the car into laterals.

The object of this invention is to relieve the reel of a sudden jerk upon starting the car, such jerks when a solid hook is employed being injurious to the reel, and a further object of the invention is to construct the hook in such a manner that a less amount of soldering is necessary in order to connect the cable to the hook.

With these objects in view the invention consists of the novel features of construction hereinafter described, pointed out in the claims and shown in the accompanying drawings, in which:

Figure 1 is a longitudinal section. Fig. 2 is a section on the line 2—2 of Fig. 1. Fig. 3 is a section on the line 3—3 of Fig. 1. Fig. 4 is a section on the line 4—4 of Fig. 1.

In these drawings 1, represents a suitable hook which is provided with a reduced shank 2, said shank being transversely perforated adjacent its lower end to receive a pin 3. The upper non-reduced portion 4 of the shank, which for convenience of description will be termed the head, is provided with an annular shoulder 4ᵃ. A suitable sleeve 5 is secured upon the shank 2 adjacent the head and bears against the head 4. Upon the lower end portion of the shank is fitted a collar 6 also suitably secured in position. Fitting over the shank and carrying the sleeve 5 and collar 6 is a metal tube 7 which is longitudinally slotted as shown at 8, said slot extending from a point adjacent the collar almost to said sleeve, and the pin 3 projects upon either side of the tube 7 through the slots 8 being adapted to work in said slots. A coiled spring 9 surrounds the tube 8 and bears at one end upon the sleeve 5 and at the other end upon the pin 3.

Fitting upon the head 4 and upon the collar 6 is a sleeve 10, the collar 6 serving to center the shank 2 and tube 7. All of the parts heretofore mentioned are formed of any suitable metal. Fitting over the sleeve 10 is an outer tube 11 formed of a suitable insulating material. Both the sleeve 10 and the tube 11 bear against the shoulder 4ᵃ and fit snugly. The outer portion of the tube 7 is solid and said solid end portion is split or bifurcated as shown at 12 for the purpose of receiving a reduced portion of a cable 13, which portion of the cable is to be soldered into the bifurcation of the tube. A sleeve 14 also of a suitable insulating material covers the outer end portion of the tube 7 extending from the collar 6 to a point beyond the outer or bifurcated end of the tube and incloses a portion of the cable. This projecting sleeve 14 is sufficiently strong and rigid to prevent the cable from bending immediately adjacent the point of soldering, thereby preventing the connection from being broken, and also enabling me to make the connection with less solder than would otherwise be required.

It will be obvious from the above description that there is a movable spring cushioned connection between the cable and the hook, the said spring taking up the shock due to sudden jerks or pulls upon the cable.

It will of course be understood that the sleeve 14 is slipped down over the cable during the soldering operation and when this operation is completed the sleeve is slipped back into position against the collar 6, thereby covering the soldered joint.

In practical use a piece of tape is wrapped about the cable adjacent the sleeve and prevents the sleeve from slipping back over the cable. As this tape does not form a part of the present invention it has not been considered necessary to illustrate it.

What I claim is:—

1. The combination with a hook adapted to engage a trolley wire, of a tube longitudinally slotted throughout a portion of its length and having a closed bifurcated end portion, said tube slipping over the shank of the hook, a pin passing through said shank and working in the slot of the tube, a spring encircling said tube and bearing at one end upon said pin, a sleeve inclosing the head of the hook and said tube, a collar carried by the tube and centering the said tube in said sleeve, a cable having an end secured in the bifurcated portion of the closed end of the tube and a sleeve fitting over said closed end and extending over the end portion of said cable.

2. The combination with a hook having a head portion provided with a shoulder and having a reduced shank, a longitudinally slotted tube fitting loosely upon said shank, a pin passing through the shank and adapted to work in the slots of the tube, a helical spring carried by said tube and arranged between said pin and the hook head, a cable having one end secured in the outer end of the tube, a sleeve of insulating material carried by the outer end portion of said tube and lapping over upon said cable, a collar fixed upon the tube between the pin and the sleeve, a second sleeve fitting upon said collar and upon the head of the hook and engaging the shoulder on said head and a covering of insulating material for said second mentioned sleeve.

FRANK W. COOPER.

Witnesses:
 JAS. E. GREEVER,
 WM. P. EVANS.